UNITED STATES PATENT OFFICE.

FRITZ BENDER, OF MÜHLHEIM, GERMANY, ASSIGNOR TO FARBWERK MÜHLHEIM, VORMALS A. LEONHARDT & CO., OF SAME PLACE.

VIOLET DISAZO DYE.

SPECIFICATION forming part of Letters Patent No. 593,347, dated November 9, 1897.

Application filed August 19, 1896. Serial No. 603,243. (Specimens.) Patented in England May 29, 1895, No. 10,669, and in France March 19, 1896, No. 254,915.

*To all whom it may concern:*

Be it known that I, FRITZ BENDER, doctor of philosophy, chemist, residing at Mühlheim, in the Grand Duchy of Hessen, Germany, have invented a new and useful Improvement in the Manufacture of Disazo Dyestuffs, of which the following is a specification, and for which patents have been granted in Great Britain, No. 10,669, dated May 29, 1895, and in France, No. 254,915, dated March 19, 1896.

I have found that the dyestuffs derived from a new ethylamidonaphtholsulfo-acid which I have produced show a remarkable affinity for the cotton fiber. This is not only the case as regards tetrazo dyes derived from benzidin and the like, but also as regards disazo dyes derived from diazoazo compounds. Thus, for instance, coloring-matters derived from diazoazobenzenesulfo-acids or diazoazonaphthalenesulfo-acids and naphtholsulfo-acids are not regarded as direct cotton-dyeing materials, while by substituting the before-mentioned ethylamidonaphtholsulfo-acid for the naphtholsulfo-acids as new endcomponent new dyes are obtained which can be easily fixed on cotton in bright shades. Thus the introduction of this ethylamidonaphtholsulfo-acid makes this class of disazo dyes hitherto only useful for the animal fiber also valuable for direct cotton-dyeing. The disazo dyes produced in such a way can be represented by the following formula:

$$R-N=N-R_1-N=N-X,$$

whereas the known class may be designated by the formula

$$R-N=N-R_1-N=N-Y,$$

X signifying the rest of ethylamidonaphtholsulfo-acid; Y signifying, for instance, a naphtholsulfo-acid; $R_1$ signifying the rest of an amin or a substituted amin which, when combined with diazo compounds, can be further diazotized; R signifying the rest of an amin or a substituted amin, the diazo compound of which is generally not capable of yielding direct azo cotton-dyes.

Among the amins of the series R the following may be mentioned: Anilin or its sulfo-acids, toluidinsulfo-acids, amidosulfosalicylic acid obtained by sulfonating, nitrating, and reducing salicylic acid, alpha-naphthylaminsulfo-acids, beta-naphthylaminsulfo-acids.

Among the amins of the series $R_1$ the following are especially mentioned: Anilin in the form of amidoazo-benzene or its sulfo-acids, orthotoluidin in the form of amidoazo-toluene or its sulfo-acids, paraxylidin, for instance, in the form of sulfanilic acid azo paraxylidin, acidylmetadiamins, such as acetylmetaphenylenediamin or metatoluylenediamin oxamine acid, alpha-naphthylamin, or its 6 or 7 monosulfo-acid. (See French Patent 213,971, dated December 21, 1891.)

My new ethylamidonaphtholsulfo-acid may be prepared in the following way: When the chlorhydrate of ethylbeta-naphthylamin is dissolved in three parts, by weight, of monohydrate of sulfuric acid and fuming sulfuric acid of twenty per cent. $SO_3$ is added at a temperature of 40° centigrade until a sample diluted with water and treated with alkali shows that sulfonation is completed, isomeric monosulfo-acids are produced which are hardly soluble in cold water, one of them forming a sodium salt which is easily soluble in cold ethyl alcohol. This latter monosulfo-acid I call "A." When, however, the chlorhydrate of ethylbeta-naphthylamin is sulfurized with monohydrate of sulfuric acid during several hours at 140° centigrade, another monosulfonic acid is formed, being likewise hardly soluble in water. This sulfo-acid I will call "B." By further sulfonating the acids A or B with five parts of fuming sulfuric acid of twenty per cent. $SO_3$ at 100° to 120° centigrade a disulfonic acid is formed, the alkaline solution of which shows a bluish-green fluorescence. This acid is easily soluble in water. By heating this disulfonic acid with caustic potash, together with some water, at about 200° centigrade (a process which is generally well known for the purpose of substituting the OH— for the $SO_3H$ group) the new ethylamidonaphtholmonosulfo-acid is produced and can be isolated by acidifying the rather concentrated alkaline solution. It is soluble with difficulty in cold water. The alkaline solution shows a violet fluorescence. When combined with tetrazostilbene-disulfo-acid in an alkaline solution, a bluish-violet coloring-matter is obtained. According to my experiments this ethylamido-naphtholsulfo-acid has the following chemical constitutions:

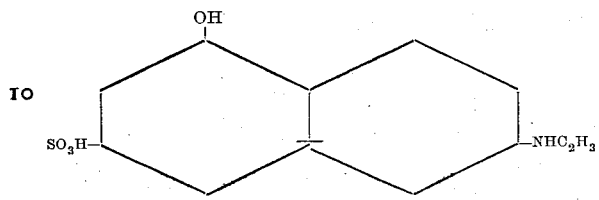

and I have found that other amidonaphtholsulfo-acids having the substituting groups in the same position give results very similar to those obtained with my new ethylamidonaphtholsulfo-acid and may therefore be regarded as equivalents for the purpose of this invention. Among such other amidonaphtholsulfo-acids I have especially tried the following:

First. 2 amido 5 naphthol 7 sulfo-acid itself. (See United States Patent No. 521,095.)

Second. 2 phenylamido 5 naphthol 7 sulfo-acid. This acid may be prepared by heating 2 naphthylamin 5.7 disulfo-acid with anilin and anilin salt during several hours up to the boiling-point (a method for phenylating which is well known to chemists) and heating the obtained phenylated acid, which is easily soluble in water, with caustic potash and some water during several hours up to about 210° centigrade (a method which is equally well known) for substituting the OH for the $SO_3H$ group. By acidifying the obtained alkaline liquid with hydrochloric acid the phenylamidonaphtholsulfo-acid is precipitated in a crystalline state. It is hardly soluble in cold water. The alkaline solution shows a violet fluorescence. When combined with tetrazostilbenedisulfo-acid in an alkaline solution, a violet coloring-matter is obtained.

Third. 2 amido 5 naphthol 1.7 disulfo-acid. The production of this acid is well known. (See United States Patent No. 532,479.)

The process for combining the diazo compounds of the amins of the series R with the amins of the series $R_1$ and the process of further diazotizing the thus obtained amidoazo compounds is well known, and I make no claim to such a process. My claim is only for the combination of a diazo-azo compound of the formula $R-N=N-R_1-N=N-$ with X X signifying ethylamidonaphtholsulfo-acid or its equivalents, as stated above, and in this regard the following general observations may be made first.

Of course, the affinity of the new dyestuffs for the cotton fiber depends in some degree on their solubility or on the number of sulfo groups contained in the molecule of these dyestuffs. I have found, however, that even the combinations of amidoazo-benzenedisulfo-acid or of beta-naphthylamin 3.6.8 trisulfo-acid azoalpha-naphthylamin with my new acid shows a considerable affinity for cotton fiber.

By employing as middle components or as amins of the series $R_1$ amins of the benzene series the shade of the disazo dye will be red to violet-red, while alpha-naphthylamin or its 6 or 7 sulfo-acid yields a reddish to bluish-violet shade. Unsubstituted amidonaphtholsulfo-acid yields a shade which is somewhat more reddish than that obtained with the ethyl or phenyl derivative. The amidonaphtholdisulfo-acid yields a product of greater solubility in water.

In some cases, when only one sulfo group is contained in the molecule of the resulting dye, the latter especially, when dried, is not easily soluble in water. In such cases it is advisable not to dry the same, but to keep it in the form of a paste. The new class of disazo dyes produced in such a way forms, when dried, a dark powder with a metallic luster. It is soluble in water with a red to violet color. The solution in concentrated sulfuric acid has a greenish to blueish shade. The new dye can be fixed on cotton without mordant, yielding beautiful red to violet shades.

The following examples will show in what manner my process may be carried into practice:

First. Employing as component R sulfanilic acid, as component $R_1$ anilin, and as component X amidonaphtholsulfo-acid. Amidoazo-benzenemonosulfo-acid is diazotized in the usual way and the diazo compound is combined with one molecular quantity of amidonaphtholsulfo-acid in a watery solution, which is kept alkaline by carbonate of soda. The red coloring-matter produced in such a way is salted out in the heat, then filtered and pressed. An analogous result is obtained, as could be expected, if amidoazo-benzenemonosulfo-acid is replaced by its homologue amidoazo-toluenemonosulfo-acid. Instead of amidonaphtholsulfo-acid its equivalents may be used, as above stated.

Second. Employing as component R sulfanilic acid, as component $R_1$ paraxylidin, and as component X ethylamidonaphtholsulfo-acid. Sulfanilic acid is diazotized and combined with paraxylidin in a well-known manner. The obtained amidoazo acid is dissolved in carbonate of soda solution and diazotized with hydrochloric acid and sodium nitrite and then combined with one molecular quantity of ethylamidonaphtholsulfo-acid in a watery solution kept alkaline by carbonate of soda. The obtained deep-red color is salted out in the heat. An analogous result is obtained by using, instead of ethylamidonaphtholsulfo-acid, its equivalents, as above stated. By using, instead of paraxylidin, acetylmetatoluylenediamin a color of a more bluish-red tint is obtained, the tints being turned still more toward blue if the acetyl group is split off by saponification.

Third. Employing as component R alpha-naphthylamin 4.7 disulfo-acid, as component R₁ alpha-naphthylamin, and as component X ethylamidonaphtholsulfo-acid. Alpha-naphthylamin 4.7 disulfo-acid is diazotized in the usual way, and the diazo compound is combined with the chlorhydrate of alpha-naphthylamin in a watery solution. When after some standing the combination is finished, the product is further diazotized in an acid solution with one molecular quantity of nitrite of sodium. The obtained diazo-azo compound is then poured into a solution of one molecular quantity of ethylamidonaphthol-monosulfo-acid kept alkaline by carbonate of soda. From the obtained violet solution the violet matter is salted out in the heat with common salt.

My experiments have shown, what was to be expected, that analogous colors of analogous chemical structure are obtained if in the third example the alpha-naphthylamin 4.7 disulfo-acid is replaced by an equivalent quantity of another naphthylaminsulfo-acid, (especially alpha-naphthylamin 3.6 disulfo-acid or beta-naphthylamin 6.8 disulfo-acid,) or of toluidinsulfo-acid, or of amidosulfosalicylic acid, or if alpha-naphthylamin is replaced by its 6 or 7 sulfo-acid, or if ethyl-amidonaphtholsulfo-acid is replaced by its equivalents, as above mentioned. The shades produced by dyeing with these colors resemble very much the shades obtained by dyeing with the colors produced according to the third example. The new color thus produced forms, when dried, a dark powder with a metallic luster. It is soluble in water with a violet color. The solution in concentrated sulfuric acid has a greenish to bluish shade. The dye can be fixed on cotton without mordant, yielding beautiful violet shades.

What I claim as my invention is—

1. The new disazo dyes herein described derived from 2 amido 5 naphthol 7 sulfo-acid and forming, when dried, dark powders of metallic luster, being soluble in water with a red to violet color, dyeing cotton without mordant, yielding beautiful red to violet shades, and the solution in concentrated sulfuric acid having a greenish to bluish shade.

2. The specific violet disazo dye produced from alpha-naphthylamin 4.7 disulfo-acid, alpha-naphthylamin and 2 ethylamido 5 naphthol 7 sulfo-acid, substantially as described, forming, when dried, a dark powder of metallic luster being soluble in water with a violet color dissolving in concentrated sulfuric acid with a greenish to bluish color and yielding on unmordanted cotton bright violet shades.

In testimony whereof I have signed my name to this specification in the presence of two subscribing witnesses.

FRITZ BENDER.

Witnesses:
RICHARD WIRTH,
EVA SATTLER.